Figure 1:
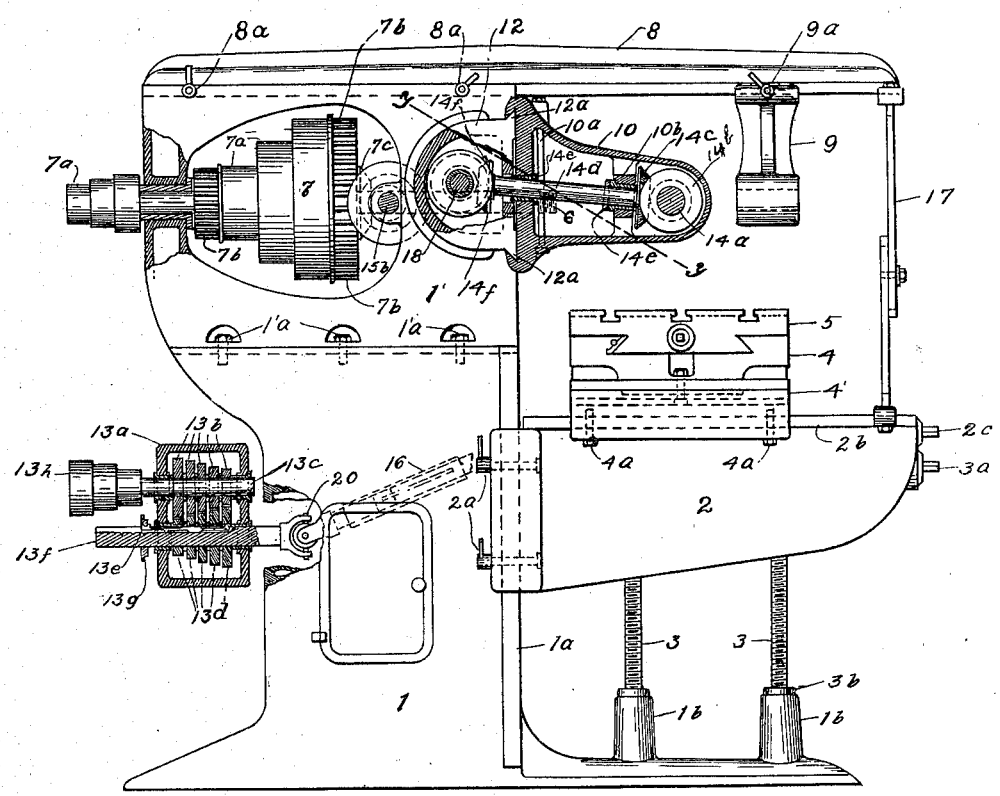

No. 734,628. PATENTED JULY 28, 1903.
A. B. SOWDEN.
COMBINED MILLING AND BORING MACHINE.
APPLICATION FILED APR. 25, 1902.

NO MODEL. 4 SHEETS—SHEET 1.

WITNESSES: INVENTOR.
Gustav Rasmus Albert B. Sowden
Ed. E. Walker BY James N. Ramsey
ATTORNEY No. 734,628. PATENTED JULY 28, 1903.
A. B. SOWDEN.
COMBINED MILLING AND BORING MACHINE.
APPLICATION FILED APR. 25, 1902.
NO MODEL. 4 SHEETS—SHEET 3.

No. 734,628. PATENTED JULY 28, 1903.
A. B. SOWDEN.
COMBINED MILLING AND BORING MACHINE.
APPLICATION FILED APR. 25, 1902.
NO MODEL. 4 SHEETS—SHEET 4.
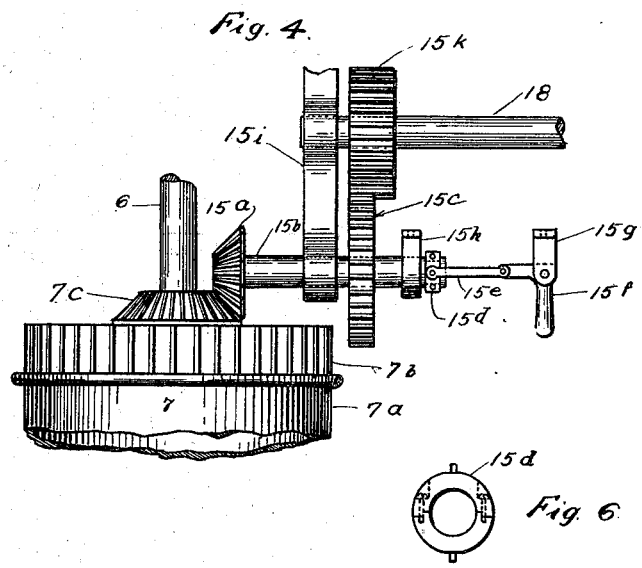
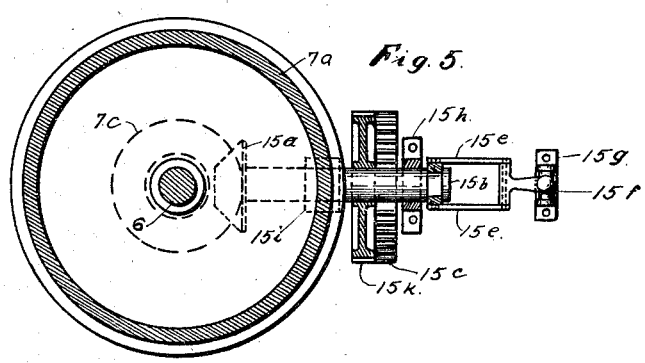
WITNESSES
Gustav Rasmus
Ed. E. Walker
INVENTOR
Albert B. Sowden
BY James A. Ramsey
ATTORNEY No. 734,628.     Patented July 28, 1903.

UNITED STATES PATENT OFFICE.

ALBERT B. SOWDEN, OF COVINGTON, KENTUCKY, ASSIGNOR OF ONE-THIRD TO EDWARD E. WALKER, OF COVINGTON, KENTUCKY.

COMBINED MILLING AND BORING MACHINE.

SPECIFICATION forming part of Letters Patent No. 734,628, dated July 28, 1903.

Application filed April 25, 1902. Serial No. 104,658. (No model.)

*To all whom it may concern:*

Be it known that I, ALBERT B. SOWDEN, a citizen of the United States, residing at Covington, in the county of Kenton and State of Kentucky, have invented certain new and useful Improvements in a Combined Milling and Boring Machine, of which the following is a specification.

My invention relates to a combined milling and boring machine.

The object of my invention is to provide a tool-dressing machine in which boring and milling devices are mounted in the same frame, the structure is simplified and rendered more convenient, and the parts are adapted to coöperate and coact with each other with respect to the work to be done.

My invention consists in mounting upon an ordinary milling-machine a cross-rail having a boring-head and tail-stock which may be adjusted horizontally thereon and may be adapted to the work; in providing said machine with variable-speed gear for moving the feed-table, in which mechanism the key is so constructed as to travel in the keyway and engage the different loose gears, which are connected to gears of belt-shaft; in having the spindle of the boring-head driven by gears so arranged as to travel back and forth on the driving-shaft, which is inside of the cross rail or beam, which from there is connected by a device (which will be hereinafter described) to the milling-machine spindle; in connecting to a belt-cone a bevel-gear having mechanism to engage and release bevel-gears to which it is connected with operating-shaft, driving-shaft for the boring devices, and mechanism for engaging, disengaging, or throwing into and out of operation of driving; in providing a bevel-gear on the main spindle, bevel-gears having necessary mechanism to engage and disengage the driving-shaft of the boring-head from or to the main spindle of the milling device; in providing an overhanging milling-arm with dovetail to prevent it from turning around; in providing an adjustable arbor-support, sliding upon said dovetail, which dovetail also prevents the milling-arm from turning, as is the case in round overhanging milling-arms, and saves the operator from moving the entire milling-arm.

My invention also consists of parts and combination and arrangement of parts, as more fully described and shown, and as particularly pointed out in the claims.

Figure 2:
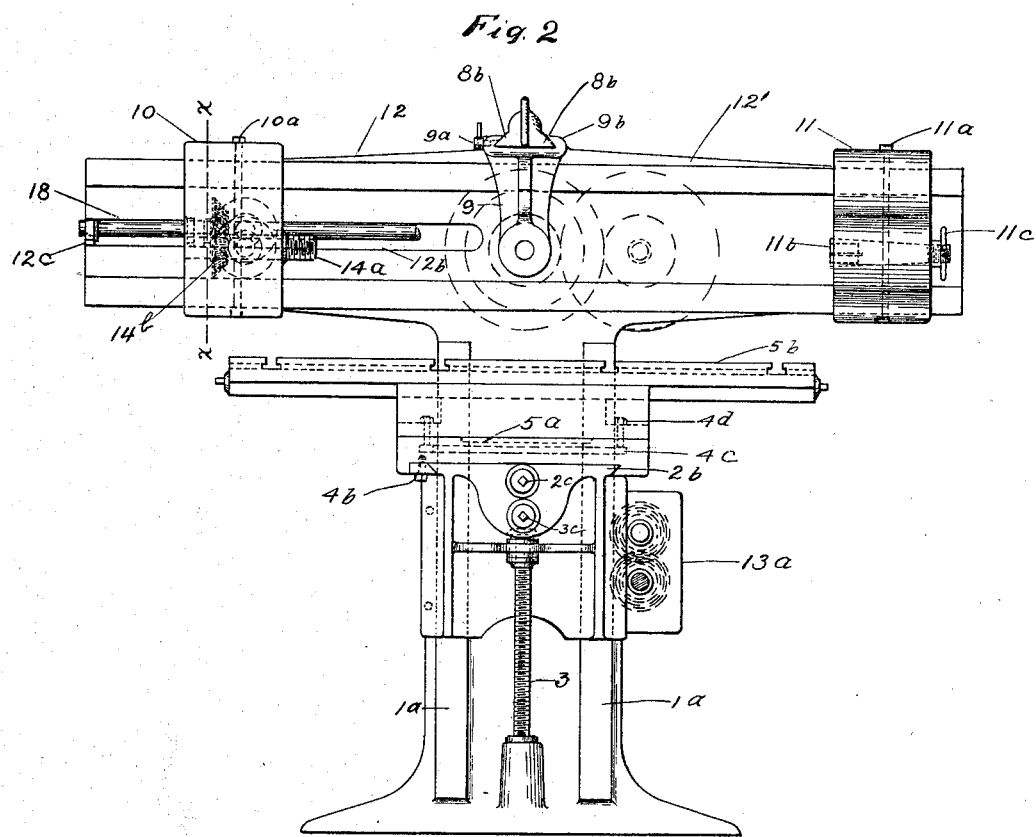
Figure 3:
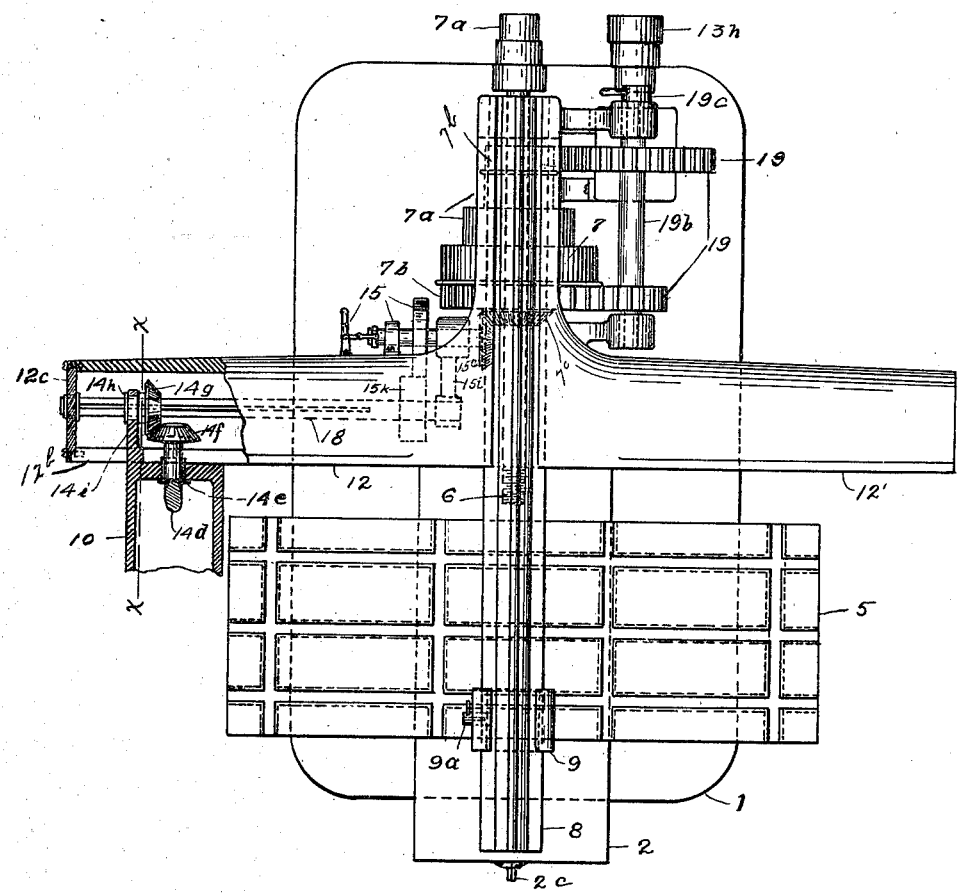

In the drawings which serve to illustrate my invention, Figure 1 is a side elevation, partly in section, of a combined milling and boring machine embodying my invention, showing a section of the cross-rail and boring-head, taken on line $xx$ of Figs. 2 and 3. Fig. 2 is a front view of the same without the overhanging arm-support. Fig. 3 is a plan view showing cross-arm and boring-head, partly in section, on line $yy$ of Fig. 1, the boring tail-stock being omitted. Fig. 4 is an enlarged detail view of gear-interlocking mechanism. Fig. 5 is a top view of the same. Fig. 6 is an enlarged detail of the coupling for connecting bevel-gear shaft with the throw-handle.

In order that my invention may be fully understood, the construction and operation of the machine illustrated in the four sheets of drawings herein will now be given.

The lower frame 1 is preferably formed hollow with door and shelves for tools, &c., and its general shape is similar to the ordinary milling-machine base. It is provided at its front with vertical dovetail pieces 1ª, upon which the knee 2 is adapted to be adjusted up and down by means of vertical screws 3, taking into threaded collars 3ᵇ, mounted in bosses 1ᵇ. This vertical adjustment is produced by turning the key 3ª, which raises or lowers the screws in the bosses 1ᵇ and carries the knee 2 up and down therewith. The clutching-screws 2ª are used to draw the knee 2 tightly to the frame at any position to which the knee may be adjusted, and thus partly support said knee and relieve the vertical screws from undue strain.

Mounted upon knee 2 is a carriage 4, secured by gib 4ᵇ, which is held in place by bolts 4ª. Said carriage is adapted, by means of screws 2ᶜ, to slide horizontally to and from the lower frame 1 for the purpose of bringing the work in proper position to the operating-tools.

The feed-table 5 is preferably formed rectangular in shape and mounted lengthwise upon the carriage parallel with the cross-rail. Said feed-table is adjustably secured to the carriage 4 by bolts $4^d$, taking into circular T-slots $4^c$ in the carriage, this being the usual construction of this type of machine, and is provided with a circular boss $5^a$, which is embedded in the carriage $4'$ and acts as a center upon which the feed-table may be rotated at any desired horizontal angle for bringing the tools into the proper relation to the work. The upper or movable part 5 of the feed-table is adapted to slide longitudinally in either direction in the dovetail track upon the carriage 4. Upon the lower frame 1 I also mount an upper frame $1'$ and secure it thereto by means of holding-down bolts $1'^a$. Dovetailed to the top of said upper frame $1'$ is an overhanging arm 8, extending over the feed-table and held in position by clamping-screws $8^a$, which are adapted to bear against the dovetails $8^b$ of the overhanging arm. Said overhanging arm 8 is braced at its opposite end by support 17, having its lower end resting upon knee 2. Upon said overhanging arm 8 is mounted an arbor-support 9, being adjustably held thereon by overlapping edges $9^b$ and clamping-screws $9^a$, which are adapted to take therethrough and bear against the dovetails $8^b$ of the overhanging arm 8.

Mounted upon the upper frame $1'$ beneath the overhanging arm 8 and at right angles thereto is the cross-rail 12 and $12'$, to which are secured the movable boring-head, movable tail-stock, and other mechanism herein set forth.

The boring-head 10 is adjustably mounted upon cross-rail 12 near its outer end and is secured thereto and held in position by clamping-bolt $10^a$. Said boring-head is provided with a suitable boss $10^b$, cast therein, to hold bearings of the boring-head mechanism.

The boring tail-stock is adjustably mounted upon the cross-rail $12'$ near its outer end and is secured and held in position by clamping-screw $11^a$. Said tail-stock is provided with a cone-shaped tube split to fit into a suitable bearing therein, so that when it is drawn up by the handle-nut $11^c$ it engages or holds fast the dead-center. (Not shown.)

Both the boring-head and tail-stock are adapted for sliding engagement with the cross-rail longitudinally thereon and are provided with bosses, which engage and are held by the dovetails $12^a$ of the cross-rail.

Referring to the boring-head mechanism, the live-spindle $14^a$ is mounted in suitable bearings in the boring-head 10 and projects over the end of the feed-table 5 and lengthwise thereof. Said live-spindle is provided with a bevel-gear $14^b$, which is keyed thereto. Shaft $14^d$, mounted in bearings $14^e$, is provided at one end with bevel-gear $14^c$, which meshes with bevel-gear $14^b$ and transmits motion to the live-spindle $14^a$, and at its other end with bevel-gear $14^f$, which meshes with bevel-gear $14^g$, which is keyed upon driving-shaft 18, so as to slide back and forth thereon, and which shaft imparts motion thereto. The bevel-gear $14^g$ is also provided with suitable collar $14^h$, which is connected to guide $14^i$, attached to the boring-head 10, to hold bevel-gears $14^g$ and $14^f$ in contact with each other while moving back and forth along the driving-shaft 18. The belt-cone 7 is mounted in suitable bearings in the upper frame on spindle 6 and gives variable speed thereto. Spindle 6 is provided with belt-cones $7^a$ to drive the variable-speed-gear mechanism. It is also provided with gear-wheels $7^b$, which are adapted to mesh with and operate back gears 19, arranged parallel therewith. The main or live spindle 6 is also rigidly secured to the belt-cone 7, and it has mounted thereon bevel-gear $7^c$, with which the bevel-gear $15^a$ of the clutch mechanism for operating the boring device may engage.

The cross-rail 12 is provided with a suitably-shaped cap $12^c$, which seats in the end thereof and forms a bearing for one end of the driving-shaft 18, the other end of which is mounted in a bearing formed in that part of the frame marked $15^i$. The cross-rail 12 is also provided upon the side adjacent the feed-table with a horizontal slot $12^b$, in which shaft $14^d$, connecting boring-head mechanism to driving-shaft, may move.

The clutch mechanism for throwing the boring devices into and out of operation is shown in detail in Figs. 4, 5, and 6 and in its relation to the other parts of the machine in plan view, Fig. 3. The shaft $15^b$ is journaled in a portion of the frame marked $15^h$ and $15^i$, and upon one end of said shaft is mounted a bevel-gear $15^a$, adapted to engage gear-wheel $7^c$ upon the live-spindle 6. Also mounted upon said shaft $15^b$ and near the center thereof is gear-wheel $15^c$, adapted to engage gear-wheel $15^k$ upon driving-shaft 18, from which it receives its motion. One end of shaft $15^b$ is provided with a coupling-collar $15^d$, to which is connected a link $15^e$, attached to crank-arm $15^f$, pivoted to bracket $15^g$. This forms a sort of toggle arrangement by which when the crank-arm $15^f$ is pulled backward in the direction away from the main or live spindle 6 the bevel-gear $15^a$ will be brought out of engagement with the bevel-gear $7^c$ and brought into engagement therewith by reversing the operation.

Suitable speed-gear mechanism is mounted in casing $13^a$, Fig. 1, secured to the rear of lower frame. Shaft $13^c$ is provided with belt-cones $13^h$, which are arranged parallel with belt-cones $7^a$, from which it is rotated. The shaft $13^f$ is attached to rod 16 by gimbal-joint 20, and through this the feed-table is operated in the ordinary way.

The back gears 19 are keyed to shaft $19^b$ and take power from and give power to gear-wheels $7^b$. An eccentric $19^c$ is provided with a handle and is adapted to throw gear-wheels 19 into and out of operation. The purpose or function of the back gear is to diminish the speed of the live-spindle 6, which is accomplished by throwing the gears 19$^a$ into engagement with the gear-wheels.

The boring-head 10 is adapted to take power at various points on the cross-rail by means of shifting the bevel-gear keyed to the driving-shaft 18, which in turn is connected to the bevel-gear which imparts power to the boring-head mechanism by means of shaft 14$^d$.

The boring device is rotated from the boring-spindle in the boring-head, and the boring-bar is held in correct position in the tail-stock, the work being clamped on table and adjusted in any position.

The clutch and its mechanism are so constructed as to start and stop the boring-head mechanism independently of the milling machine or apparatus while the latter is in motion. This boring mechanism will also stop when the milling mechanism or the main spindle thereof is not in motion, because it takes its power therefrom.

The operation of my machine is as follows: First secure the work to be milled and bored to the feed-table in the ordinary way, then adjust the knee 2 to the proper vertical position by turning key 3$^a$, then draw the knee 2 tightly to the frame by means of the clutching-screws 2$^a$. Next adjust the feed-table to or from the frame 1 by turning screw 2$^c$. When the work has thus been adjusted in its proper relation to the cutting-tools, which are secured to the end of live-spindle 6, and if the work is of such a class as to cause a great deal of strain upon the tools, they may be mounted upon an arbor, one end of which is fastened to the live-spindle and the other guided by or in the arbor-support 9. Next adjust the key 13$^e$, so that the boss 13$^n$ thereof locks the loose gear of proper size for speed required, and then start the machine by placing belt on main belt-cone of proper size. The work is fed to the tools by means of an automatic feeding device of some well-known design and provided with variable-speed device which is adapted to give the proper speed of feeding. After a piece of work has been milled the only essential change to be made for boring is the taking out of the milling-tools and the setting up or adjusting of the boring-tools. Other changes depend entirely on the shape and construction of the piece of work to be operated upon. The boring-tools are started by means of the clutch mechanism shown in Figs. 3 and 4, which show the parts in operative position. To throw the parts out of operation, simply pull the crank-handle 15$^f$, as before explained. It will be apparent that when the clutch mechanism is in the position shown in Figs. 3 and 4 the bevel-gear 7$^c$ will impart motion to bevel-gear 15$^a$, which drives shaft 15$^b$, carrying gear-wheel 15$^c$, meshing with gear-wheel 15$^k$, keyed to shaft 18, which bevel-gear 14$^g$, keyed thereon, imparts motion to bevel-gear 14$^f$ on shaft 14$^d$, which carries bevel-gear 14$^c$ and imparts motion to the live boring-spindle 14$^a$ through bevel-gear 14$^b$, keyed thereon, and thus imparting motion to the boring-tools or cutters to do the required work.

An important feature of my device is that the boring mechanism is adapted to operate upon the work alternately with the milling-tools, either with or without readjusting the work on the feed-table.

Great advantage is also derived in providing a combined milling and boring machine in which the boring-spindle is arranged at right angles to the milling-spindle.

It will be apparent from the above description that my invention is capable of some modification without material departure from the scope and spirit thereof, and for this reason I do not wish to be understood as limiting myself to the precise form and arrangement of the parts herein set forth.

I claim—

1. In a combined milling and boring machine, a milling-machine frame, a milling-spindle, means for actuating the same, a cross-rail arranged horizontally thereon in the horizontal plane of the milling-spindle, and projecting right and left of the center of the milling-spindle, and a boring and centering device mounted upon said rail, and gearing intermediate said milling-spindle and said boring-head for actuating the same.

2. In a combined milling and boring machine, a milling-machine frame, a milling-spindle, a cross-rail arranged in a horizontal plane of the milling-spindle, an adjustable boring-head, and an adjustable tail-stock mounted on said cross-rail at its opposite ends, a boring-spindle, gearing between the boring-spindle and the milling-spindle including adjustable elements arranged to keep the gearing in mesh throughout all adjustments of the boring-head.

3. In a combined milling and boring machine, a milling-machine frame, a milling-spindle having a bevel-gear thereon, a cross-rail, boring devices mounted thereon, clutch mechanism comprising a sliding shaft with a spur bevel-gear thereon, meshing with a bevel-gear on the milling-spindle, a crank-handle and link-and-collar connection for moving the sliding shaft to throw the boring device into and out of operative relation to the main spindle or driving-shaft.

4. In a combined milling and boring machine, a milling-machine frame, a milling-spindle shaft, a cross-rail, an adjustable boring-head, and an adjustable tail-stock mounted on said cross-rail at opposite ends, interposed gearing between the milling-spindle shaft and the adjustable boring-head, and means for connecting and disconnecting said gearing.

5. In a combined milling and boring machine, a frame, a cross-rail, suitable operative mechanism, a driving-shaft in said cross-rail, a guide and collar secured thereto, and taking over the driving-shaft, a boring-head secured to said guide to move therewith, whereby the boring-head may be adjusted along said cross-rail, a boring device, a bevel-gear mounted on said shaft, and adapted to move thereon lengthwise thereof and a bevel-gear meshing therewith and communicating power to the boring device.

ALBERT B. SOWDEN.

Witnesses:
JAMES N. RAMSEY,
VIOLET H. SPENCER.